US012742291B2

(12) United States Patent
Nyflött et al.

(10) Patent No.: US 12,742,291 B2
(45) Date of Patent: Sep. 22, 2026

(54) BARRIER COATING FOR PAPER AND PAPERBOARD

(71) Applicant: Stora Enso OYJ, Helsinki (FI)

(72) Inventors: Åsa Nyflött, Karlstad (SE); Chris Bonnerup, Floda (SE); Isabel Knöös, Säffle (SE); Anders Karlsson, Karlstad (SE)

(73) Assignee: Stora Enso OYJ, Helsinki (FI)

( * ) Notice: Subject to any disclaimer, the term of this patent is extended or adjusted under 35 U.S.C. 154(b) by 155 days.

(21) Appl. No.: 18/568,432

(22) PCT Filed: Jun. 7, 2022

(86) PCT No.: PCT/IB2022/055278
§ 371 (c)(1),
(2) Date: Dec. 8, 2023

(87) PCT Pub. No.: WO2022/259134
PCT Pub. Date: Dec. 15, 2022

(65) Prior Publication Data

US 2024/0271368 A1 Aug. 15, 2024

(30) Foreign Application Priority Data

Jun. 9, 2021 (SE) .................................. 2150729-8

(51) Int. Cl.

| | |
|---|---|
| ***D21H 19/34*** | (2006.01) |
| ***C08J 5/18*** | (2006.01) |
| ***C08J 7/04*** | (2020.01) |
| ***C09D 101/28*** | (2006.01) |
| ***C09D 105/14*** | (2006.01) |
| ***D21H 17/26*** | (2006.01) |
| ***D21H 19/54*** | (2006.01) |

(52) U.S. Cl.
CPC ................ *D21H 19/34* (2013.01); *C08J 5/18* (2013.01); *C08J 7/0427* (2020.01); *C09D 101/286* (2013.01); *C09D 105/14* (2013.01); *D21H 17/26* (2013.01); *D21H 19/54* (2013.01); *C08J 2401/28* (2013.01); *C08J 2403/04* (2013.01); *C08J 2405/02* (2013.01); *C08J 2405/04* (2013.01); *C08J 2405/08* (2013.01); *C08J 2405/14* (2013.01)

(58) Field of Classification Search
None
See application file for complete search history.

(56) References Cited

U.S. PATENT DOCUMENTS

| | | | | |
|---|---|---|---|---|
| 4,186,024 | A | 1/1980 | Fujimoto et al. | |
| 5,658,622 | A | 8/1997 | Berlin et al. | |
| 2006/0173104 | A1 | 8/2006 | Gatenholm et al. | |
| 2013/0101865 | A1* | 4/2013 | Ren | D21H 19/82 428/481 |
| 2014/0065406 | A1 | 3/2014 | Berglund et al. | |
| 2014/0272352 | A1* | 9/2014 | Tilton | C08J 11/06 428/335 |
| 2015/0119505 | A1 | 4/2015 | Williams et al. | |
| 2016/0122568 | A1* | 5/2016 | Catchmark | C08L 1/02 106/162.2 |
| 2017/0016182 | A1* | 1/2017 | Mondala | F28C 3/08 |
| 2020/0056333 | A1* | 2/2020 | Backfolk | D21H 27/10 |
| 2020/0291580 | A1* | 9/2020 | Jung | D21H 19/34 |

FOREIGN PATENT DOCUMENTS

| | | | |
|---|---|---|---|
| EP | 0496269 | A2 | 7/1992 |
| JP | H10325097 | A | 12/1998 |
| JP | 2004524419 | A | 8/2004 |
| JP | 2013540848 | A | 11/2013 |
| SE | 460672 | B | 11/1989 |
| WO | 02079332 | A1 | 10/2002 |
| WO | 2012035046 | A2 | 3/2012 |

OTHER PUBLICATIONS

Extended European Search Report from corresponding European application No. 22819724.0, dated Mar. 14, 2025.
Jonas Hartman et al., Oxygen Barrier Materials from Renewable Sources: Material Properties of Softwood Hemicellulose-Based Films, Journal of Applied Polymer Science, vol. 100, 2985-2991 (2006).
Antonia Svärd, et al., Rapeseed straw as a renewable source of hemicelluloses: Extraction, characterization and film formation, Carbohydrate Polymers, 133 (2015) 179-186.
Ali Abdulkhani et al., Preparation of xylan bio-composite films reinforced with oxidized carboxymethyl cellulose and nanocellulose, Polymer Bulletin (2020) 77:6227-6239.
International Search Report from corresponding PCT application No. PCT/IB2022/055278, mailed Jul. 1, 2022.

* cited by examiner

*Primary Examiner* — Chinessa T. Golden

(74) *Attorney, Agent, or Firm* — Greer, Burns & Crain, Ltd.

(57) ABSTRACT

The present invention relates to an aqueous barrier coating composition comprising: 20-80% by weight of a dissolved first polysaccharide having a first degree of polymerization (DP1) of at least 150, based on the total solids content of the aqueous barrier coating composition; and 20-80% by weight of a dissolved second polysaccharide having a second degree of polymerization (DP2) of 100 or less, based on the total solids content of the aqueous barrier coating composition; wherein the ratio of DP1:DP2 is at least 10:1; and wherein the aqueous barrier coating composition has a total solids content in the range of 10-90% by weight.

32 Claims, No Drawings

BARRIER COATING FOR PAPER AND PAPERBOARD

This application is a U.S. National Phase under 35 U.S.C. § 371 of International Application No. PCT/IB2022/055278, filed Jun. 7, 2022, which claims priority under 35 U.S.C. §§ 119 and 365 to Swedish Application No. 2150729-8 filed Jun. 9, 2021.

TECHNICAL FIELD

The present disclosure relates to coating compositions for coating of fiber-based substrates, such as paper or paperboard to improve their barrier properties, particularly oxygen and grease barrier properties. The disclosure further relates to fiber-based substrates coated with such coating compositions.

BACKGROUND

Effective gas, aroma, and/or moisture barriers are required in packaging industry for shielding sensitive products. Particularly, oxygen-sensitive products require an oxygen barrier to extend their shelf-life. Oxygen-sensitive products include many food products, but also pharmaceutical products and electronic industry products. Known packaging materials with oxygen barrier properties may be comprised of one or several polymer films or of a fiber-based substrate, e.g. paper or board, coated with one or several layers of an oxygen barrier polymer, usually as part of a multilayer coating structure.

Another important property for packaging for food products is resistance to grease and oil.

Barriers are normally created by coating the fiber-based substrate with a composition which gives the substrate barrier properties. Different coatings can be applied depending on the required barrier properties. The most commonly used materials when forming a barrier on a fiber-based substrate, are polyethylene (PE), polypropylene (PP), polyethylene terephthalate (PET), polyamide (PA), ethylene vinyl alcohol (EVOH) or ethylene vinyl acetate (EVA). EVOH is normally used in order to create oxygen barriers and PE or PET is normally used in order to create a liquid and/or vapor barrier. The polymers are normally either laminated or extrusion coated to the fiber-based substrate. However, a polymer layer that gives a product barrier properties normally needs to be relatively thick and it is thus quite costly to produce such barrier.

The most common way to approach reduction of oxygen transmission (OTR) through a paper or paperboard is to use multiple polymer layers. In this way, one layer can provide low OTR, whereas other layers can provide water repellency and/or low water vapor transmission rates.

Another commonly used barrier material is aluminum. Aluminum layers are typically used in order to improve the oxygen and light barrier of paper or paperboard products. The aluminum layers are thin, typically around 7-9 μm. Aluminum provides excellent barrier properties, but it significantly increases the carbon dioxide load of the product.

A problem with both polymer and aluminum layers is also that they decrease the biodegradability and the possibility to efficiently recycle the packaging materials.

There is a demand from producers, converters and end users to avoid the use of synthetic polymer and aluminum layers in paper or paperboard products in order to decrease the carbon dioxide load and improve the biodegradability and recyclability of the products.

Therefore, there exists a need for improved processes for providing fiber-based substrates, such as paper or paperboard, with improved barrier properties.

DESCRIPTION OF THE INVENTION

It is an object of the present disclosure to provide a barrier film or coating for fiber-based substrates that alleviates at least some of the problems of prior art barrier films and coatings.

It is a further object of the present disclosure to provide a barrier film or coating for fiber-based substrates that provides good resistance to oxygen and/or grease.

It is a further object of the present disclosure to provide a barrier film or coating, which can be efficiently applied to fiber-based substrates using conventional coating methods.

According to a first aspect illustrated herein, there is provided an aqueous barrier coating composition comprising:

- 20-80% by weight of a dissolved first polysaccharide having a first degree of polymerization (DP1) of 150 or more, based on the total solids content of the aqueous barrier coating composition; and
- 20-80% by weight of a dissolved second polysaccharide having a second degree of polymerization (DP2) of 100 or less, based on the total solids content of the aqueous barrier coating composition;

wherein the ratio of DP1:DP2 is at least 10:1; and wherein the aqueous barrier coating composition has a total solids content in the range of 10-90% by weight.

The present invention is based on the surprising realization that short water-soluble polysaccharides, having a degree of polymerization (DP) of 100 or less, for example an anionic hemicellulose such as xylan, can form good barrier films when combined with longer water-soluble polysaccharides, having a degree of polymerization (DP) of 150 or more, for example carboxymethyl cellulose.

The inventors have found that in addition to providing barrier films and coatings having excellent oxygen and grease barrier properties, the combination of a relatively high amount of a relatively short water-soluble polysaccharide and a longer water-soluble polysaccharide, makes it possible to prepare aqueous barrier coating compositions with a high total solids content, such as 10, 20 or even 30% by weight or more, while still maintaining a reasonably low viscosity. This allows for the aqueous barrier coating composition to be efficiently applied to a substrate using conventional coating methods.

The inventive aqueous barrier coating composition comprising a combination of polysaccharides has been found to provide good barrier properties towards air, oxygen and water vapor, while at the same time having a low negative impact on re-pulping and recycling of the used barrier film. The barrier film can be applied to a paper or paperboard based substrate in a paper machine at high speed with good runnability.

The aqueous barrier coating composition comprises the first polysaccharide and the second polysaccharide dissolved in an aqueous medium. The aqueous medium may be water or an aqueous solution, or it may comprise a mixture of water or an aqueous solution with an organic solvent. In a preferred embodiment, the aqueous medium is water based, i.e., it is comprised of more than 50% by weight of water. In a more preferred embodiment, the aqueous medium is water.

The first polysaccharide and the second polysaccharide are dissolved in the aqueous barrier coating composition. The term "dissolved" as used herein denotes that the polysaccharide molecules are homogenously mixed in the aqueous medium. Accordingly, the first polysaccharide and the second polysaccharide are preferably both water-soluble. The term "water-soluble" as used herein denotes that the polysaccharides are capable of being dissolved in the aqueous medium at least to a concentration required to prepare the aqueous barrier coating composition at a temperature not exceeding 100° C., at atmospheric pressure.

Solutions of polysaccharides may have high viscosities, event at relatively low total solids contents. An advantage of the inventive coating composition is that it allows high total solids content, such as 30% by weight or even higher, while still maintaining a reasonably low viscosity. The terms "total solids content" or "solids content" as used herein refer to the total fraction of dissolved solids plus suspended and settleable solids in an aqueous solution or suspension. The aqueous barrier coating composition has a relatively high solid content. The aqueous barrier coating composition has a total solids content in the range of 10-90% by weight. In some embodiments, the aqueous barrier coating composition has a total solids content in the range of 10-80% by weight, preferably 20-70% by weight, and more preferably in the range of 20-50% by weight.

The high solids content combined with low viscosity reduces transportation costs of the coating composition and makes it possible prepare coatings with high basis weight in a single coating step. A high solids content also reduces the amount of water to be removed when the film or coating is dried, which can reduce the drying energy requirement of the coating process. Preferably, the total solids content of the coating composition is at least 10% by weight, more preferably at least 20%, or at least 30% by weight. The total solids content of the coating composition is typically 90% by weight or less, preferably 80% by weight or less, more preferably 70% by weight or less.

The total solids content of the aqueous barrier coating composition preferably comprises the first polysaccharide as its main component. The total solids content of the aqueous barrier coating composition preferably comprises 30-80% by weight, preferably 40-80% by weight, and more preferably 50-80% by weight, of the first polysaccharide based on the total solids content of the aqueous barrier coating composition.

Polysaccharides comprise a polymeric chain of monosaccharide repeating units. The monosaccharide units can be the of the same type (a homo-polysaccharide) or different (a hetero-polysaccharide). The number of monosaccharide units in a polysaccharide is termed degree of polymerization (DP). The first polysaccharide has a first degree of polymerization (DP1) of 150 or more, and the second polysaccharide has a second degree of polymerization (DP2) of 100 or less, and the ratio of DP1:DP2 is at least 10:1. I.e, if DP1 is 200, then DP2 must be 20 or less. In some embodiments, the ratio of DP1:DP2 is at least 20:1, preferably at least 30:1.

In some embodiments, the first polysaccharide has a first degree of polymerization (DP1) in the range of 150-4000, preferably in the range of 150-2000, and more preferably in the range of 150-1000.

In some embodiments, the first polysaccharide is anionic, meaning that the polysaccharide comprises at least one anionic functional group. The anionic functional group will typically be a carboxylate/carboxylic acid functional group, but other anionic functional groups are also possible. The anionic functional group(s) may be naturally occurring in the polysaccharide, such as carboxylate/carboxylic acid functional group in glucuronic acid or galacturonic acid, or introduced by chemical modification, e.g. oxidation or grafting of the polysaccharide.

In some embodiments, the first polysaccharide is selected from the group consisting of a water-soluble hemicellulose, a water-soluble cellulose, a water-soluble starch, alginate, chitosan, pullulan, dextran, and agarose.

Hemicellulose, cellulose and starch typically have low solubility in water in their native states. The terms "a water-soluble hemicellulose", "a water-soluble cellulose", and "a water-soluble starch" as used herein refer to hemicellulose, cellulose and starch derivatives which in which the native polysaccharides have been physically, chemically, or physicochemically modified to increase their solubility in water.

In some embodiments, the first polysaccharide is selected from the group consisting of a water-soluble hemicellulose, a water-soluble cellulose, a water-soluble starch, and alginate.

In some embodiments, the first polysaccharide is selected from the group consisting of carboxymethylcellulose, methylcellulose, hydroxyethyl cellulose, hydroxypropyl cellulose, hydroxylpropylmethyl cellulose, ethyl hydroxyethyl cellulose (EHEC), and methyl ethyl hydroxyethyl cellulose (MEHEC).

In some embodiments, the first polysaccharide is carboxymethylcellulose (CMC).

The aqueous barrier coating composition further comprises a relatively high amount of a second polysaccharide having a second degree of polymerization (DP2) of 100 or less. This is a short chain length as compared to, for example, cellulose consisting of about 7,000-15,000 glucose molecules. The aqueous barrier coating composition comprises 20-80% by weight of the second polysaccharide based on the total solids content of the aqueous barrier coating composition.

In some embodiments, the aqueous barrier coating composition comprises 20-60% by weight, preferably 20-40% by weight, and more preferably 20-30% by weight, of the second polysaccharide based on the total solids content of the aqueous barrier coating composition.

In some embodiments, the second polysaccharide has a first degree of polymerization (DP1) in the range of 2-50, preferably in the range of 2-25, and more preferably in the range of 2-12.

In some embodiments, second polysaccharide is a short saccharide chain comprised of 2-12 monosaccharide units. In some embodiments, the second polysaccharide has a DP in the range of 2-8, preferably in the range of 2-5. The molecular weight of the second polysaccharide as used herein may typically be in the range of 250-2000 g/mol, such as in the range 250-1500 g/mol or in the range of 250-1000 g/mol.

The second polysaccharide can be a natural polysaccharide or prepared synthetically, e.g. by chemical or synthetic hydrolysis of a longer polysaccharide.

In some embodiments, the second polysaccharide is anionic, meaning that the polysaccharide comprises at least one anionic functional group. The anionic functional group will typically be a carboxylate/carboxylic acid functional group, but other anionic functional groups are also possible. The anionic functional group(s) may be naturally occurring in the polysaccharide, such as carboxylate/carboxylic acid functional group in glucuronic acid or galacturonic acid, or introduced by chemical modification, e.g. oxidation or grafting of the polysaccharide.

In some embodiments, the second polysaccharide is selected from the group consisting of a water-soluble hemicellulose, a water-soluble cellulose, a water-soluble starch, alginate, chitosan, pullulan, dextran, and agarose.

In some embodiments, the second polysaccharide is selected from the group consisting of a water-soluble hemicellulose, a water-soluble cellulose, a water-soluble starch, and alginate.

Hemicelluloses are substituted/branched polysaccharides ranging from low to high molecular weight. They consist of different sugar units arranged in different portions and with different substituents.

Hemicelluloses can be divided into the main groups of xylans, xyloglucans, glucomannans, and mixed linkage beta-glucans. Some of the hemicelluloses naturally carry a negative charge due to the presence of glucuronic acid and/or galacturonic acid units in the saccharide chain. The hemicellulose for use in the aqueous barrier coating composition are preferably such anionic hemicelluloses. Hemicelluloses are easily hydrolyzed by dilute acid or base as well as various hemicellulase enzymes.

In some embodiments, the second polysaccharide is xylan. Xylans are present in biomass such as wood, cereals, grass and herbs and they are considered to be the second most abundant biopolymer in the plant kingdom. To separate xylans from other components in various sources of biomass, extraction with water and aqueous alkali can be used.

In some embodiments, the second polysaccharide is a xylan comprised of 2-12 monosaccharide units. In some embodiments, the xylan has a DP in the range of 2-8, preferably in the range of 2-5.

The formulation of the aqueous barrier coating composition may vary greatly depending on the intended use of the coating and the coated substrate. In some embodiments, the total solids content of the aqueous barrier coating composition consists solely of the first polysaccharide and the second polysaccharide. In other embodiments, the coating composition may further include a wide range of ingredients in varying quantities to improve the end performance of the product or processing of the coating.

The aqueous barrier coating composition may further comprise additional components dissolved or dispersed in the aqueous medium. The total amount additional components dissolved or dispersed in the aqueous medium is less than 50% by weight, preferably less than 40% by weight, more preferably less than 30% by weight, based on the total solids content of the aqueous barrier coating composition.

In some embodiments a filler is added to the aqueous barrier coating composition to improve the barrier properties and the mechanical properties of the resulting films or coatings. In some embodiments, the aqueous barrier coating composition comprises 1-30% by weight of a filler based on the total solids content of the aqueous barrier coating composition. In some embodiments, the amount of the filler in the aqueous barrier coating composition is below the critical pigment volume concentration (CPVC).

In some embodiments, the filler is selected from the group consisting of clay (such as kaolin or calcined kaolin), talcum, $CaCO_3$ (such as PCC or GCC), $TiO_2$, $Al_2O_3$, $SiO_2$, bentonite, fibers, or a mixture thereof. The fibers may preferably be any fiber having a hydrophilic surface and a having a density close to the density of water, i.e. preferably in the range of 0.85-1.15 g/cm$^3$ or in the range of 0.90-1.10 g/cm$^3$. In some embodiments, the filler is selected from the group consisting of clay, talcum, $CaCO_3$, and fibers, or combinations thereof.

In some embodiments, a plasticizer is added to the aqueous barrier coating composition to increase the elasticity of the resulting films or coatings and make them less brittle. This allows the formed films or coatings to better withstand bending without losing their barrier properties. In some embodiments, the aqueous barrier coating composition, comprises 1-30% by weight of a plasticizer based on the total solids content of the aqueous barrier coating composition.

In some embodiments, the plasticizer is an organic compound containing multiple hydroxyl groups, such as a diol, a triol or other polyol. In some embodiments, the plasticizer is selected from the group consisting of glycerol, xylitol, sorbitol, maltitol, ethylene glycol, propylene glycol, butanediol, pentaerythritol, trimethylolpropane, and combinations thereof.

The aqueous barrier coating composition may also comprise a polycationic polymer acting as a crosslinker or insolubilizer. A polycationic polymer acting as a crosslinker or insolubilizer is especially useful when the first and/or second polysaccharide is anionic.

In some embodiments, the aqueous barrier coating composition comprises 0.1-10% by weight of a polycationic polymer based on the total solids content of the aqueous barrier coating composition.

The polycationic polymer is a synthetic or natural polymer having a plurality of cationic functional groups. Examples of polycationic polymers for use in the present invention are selected from the group consisting of poly(N-methylvinylamine), polyallylamine, polyallyldimethylamine, polydiallylmethylamine, polydiallyldimethylammonium chloride (pDADMAC), polydiallyldimethylammonium trifluoromethanesulfonate (pDADMAT), polydiallyldimethylammonium nitrate (pDADMAN), polydiallyldimethylammonium perchlorate (pDADMAP), polyvinylpyridinium chloride, poly(2-vinylpyridine), poly(4-vinylpyridine), polyvinylimidazole, poly(4-aminomethylstyrene), poly(4-aminostyrene), polyvinyl(acrylamide-co-dimethylaminopropylacrylamide), polyvinyl(acrylamide-co-dimethylaminoethylmethacrylate), polyethyleneimine, polylysine, DAB-Am and PAMAM dendrimers, polyaminoamides, polyhexamethylenebiguanide, polydimethylamine-epichlorohydrine, aminopropyltriethoxysilane, N-(2-aminoethyl)-3-aminopropyltrimethoxysilane, N-trimethoxysilylpropyl-N,N,N-trimethylammonium chloride, bis(trimethoxysilylpropyl)amine, chitosan, cationic starch, cationic gelatin, the product of alkylation of polyethyleneimine by methylchloride, the product of alkylation of polyaminoamides with epichlorohydrine, cationic polyacrylamide with cationic monomers, dimethyl aminoethyl acrylate methyl chloride (AETAC), dimethyl aminoethyl methacrylate methyl chloride (METAC), acrylamidopropyl trimethyl ammonium chloride (APTAC), methacryl amidopropyl trimethyl ammonium chloride (MAPTAC), diallyl dimethyl ammonium chloride (DADMAC), ionones, silanes and mixtures thereof. The polycationic polymer may also be a polycationic polypeptide or protein.

In some embodiments, the cationic polymers are selected from the group consisting of: polyaminoamides, polyethyleneimine, polyvinylamine, polydiallyldimethylammonium chloride (pDADMAC), chitosan, cationic starch, and cationic gelatin.

In preferred embodiments, the polycationic polymer is a polyethyleneimine (PEI).

In some embodiments, the polycationic polymer has a weight average molecular weight in the range of 2 000-1 000 000 g/mol, preferably in the range of 10 000-100 000 g/mol.

The coating composition is preferably provided in a formulation suitable for application to paper or paperboard using conventional paper coating equipment and techniques, such blade coaters, bar coaters, and curtain coaters. Accordingly, the coating composition may include various additives to impart suitable coating characteristics. Such coating additives may include, but are not limited to, a dispersing agent (e.g. a surfactant), a lubricant (e.g. a stearate), a rheology modifier, an insolubilizer, a humectant, a barrier chemical, and a pH adjusting agent (e.g. NaOH).

The aqueous barrier coating composition can be applied to a substrate and dried to form a barrier film or coating. Thus, according to a second aspect illustrated herein, there is provided a barrier film or coating comprising:

20-80% by weight of a first polysaccharide having a first degree of polymerization (DP1) of at least 150, based on the total solids content of the barrier film or coating; and 20-80% by weight of a second polysaccharide having a second degree of polymerization (DP2) of 100 or less, based on the total solids content of the barrier film or coating;

wherein the ratio of DP1:DP2 is at least 10:1.

The barrier film or coating is preferably dry or substantially dry. The barrier film or coating preferably has a total solids content above 90% by weight, preferably above 95% by weight.

It is understood that the composition of the barrier film or coating according to the second aspect will correspond to the composition of the total solids content of the aqueous barrier coating composition according to the first aspect. For example, a dry content of 20-80% by weight of the first polysaccharide in the aqueous barrier coating composition results in a content of 20-80% by weight of the first polysaccharide in the dry barrier film or coating.

The film or coating according to the invention may generally have a basis weight of 30 $g/m^2$ or less. Typically, a basis weight of at least 1 $g/m^2$ is required to obtain acceptable barrier properties. In some embodiments, the basis weight of the film or coating is in the range of 5-15 $g/m^2$, preferably in the range of 5-10 $g/m^2$.

The film or coating according to the invention may generally have a thickness of 100 μm or less. In particular, the film or coating may have a thickness of 50 μm or less, or more specifically the film or coating may have a thickness of 15 μm or less or 10 μm or less. In some embodiments, the thickness of the film or coating is in the range of 1-15 μm, preferably in the range of 5-10 μm.

In some embodiments, the barrier film or coating is prepared from an aqueous barrier coating composition as described herein with reference to the first aspect.

The inventive barrier film or coating has good oxygen and grease barrier properties.

In some embodiments, the barrier film or coating has an oxygen transmission rate (OTR), measured according to the standard ASTM D-3985 at 50% relative humidity and 23° C., of less than 50 $cc/m^2/24$ h/atm, preferably less than 30 $cc/m^2/24$ h/atm, and more preferably less than 10 $cc/m^2/24$ h/atm.

In some embodiments, the barrier film or coating has a KIT value of at least 8, preferably at least 10, as measured according to standard TAPPI T559.

The aqueous barrier coating composition according to the first aspect, and the barrier film or coating according to the second aspect are preferably biobased. The term biobased as used herein refers to products or materials wholly or partly derived from biomass, such as plants, trees or animals. The biomass can have undergone physical, chemical or biological treatment. Preferably at least 75% by weight, and more preferably at least 90% by weight of the total solid content of the aqueous barrier coating composition according to the first aspect, or of the barrier film or coating according to the second aspect, is biobased.

According to a third aspect illustrated herein, there is provided a coated substrate comprising a substrate coated with an aqueous barrier coating composition according to the first aspect.

The aqueous barrier coating composition according to the first aspect is of particular interest for coating of fiber-based substrates. Thus, in some embodiments, the coated substrate is a fiber-based substrate. The fiber-based substrate is preferably a paper or paperboard.

Paper generally refers to a material manufactured in sheets or rolls from the pulp of wood or other fibrous substances comprising cellulose fibers, used for e.g. writing, drawing, or printing on, or as packaging material. Paper can either be bleached or unbleached, coated or uncoated, and produced in a variety of thicknesses, depending on the end-use requirements.

Paperboard generally refers to strong, thick paper or cardboard comprising cellulose fibers used for example as flat substrates, trays, boxes and/or other types of packaging. Paperboard can either be bleached or unbleached, coated or uncoated, and produced in a variety of thicknesses, depending on the end-use requirements.

The aqueous barrier coating composition can either be added on the papermaking machine (on-machine coating) or on a separate machine (off-machine coating). A variety of paper coating equipment and techniques may be used for applying the coating composition, for example blade coaters, bar coaters, air knife coaters, curtain coaters, and cast coaters. The coating composition can be applied to one side or both sides of the paper or paperboard.

The surface of the paper or paperboard on which the aqueous barrier coating is to be applied may preferably be pre-treated, e.g. by dispersion coating mineral coating, to decrease the porosity of the surface. This way the amount of the aqueous barrier coating can be reduced. Thus, in some embodiments, coated substrate is a dispersion coated, preferably mineral coated, paper or paperboard.

The coated substrate is preferably suitable for being repulped. In some embodiments, the coated substrate has a repulpability characterized by a reject rate (as determined according to the PTS RH 021/97 test method) below 20%, preferably below 10%, more preferably below 5%, and most preferably below 1%.

According to a fourth aspect illustrated herein, there is provided a method for the manufacture of a barrier film or coating, comprising:

a) preparing an aqueous barrier coating composition as described herein with reference to the first aspect;
b) forming a wet film or coating of the aqueous barrier coating composition; and
c) drying the wet film or coating to obtain the barrier film or coating.

The aqueous barrier coating composition has a total solids content in the range of 10-90% by weight. In some embodiments, the aqueous barrier coating composition has a total solids content in the range of 10-80% by weight, preferably in the range of 20-70% by weight, more preferably in the range of 20-50% by weight.

In the drying step c), the total solids content of the wet film or coating is increased by evaporation of water. The resulting barrier film or coating preferably has a total solids content above 90% by weight.

In some embodiments, the basis weight of the dried barrier film or coating is in the range of 5-15 g/m$^2$, preferably in the range of 5-10 g/m$^2$.

In some embodiments, the thickness of the dried barrier film or coating is in the range of 1-15 μm, preferably in the range of 5-10 μm.

The term coating as used herein refers generally to a finishing operation in which the surface of a substrate, for example a fiber-based substrate such as a paper or paperboard, is covered with a composition to impart a desired finish or texture to the substrate or to improve its printability or other properties, such as optical or barrier properties. The term barrier coating as used herein refers generally to a coating designed to impart improved barrier properties to the substrate.

The term film as used herein refers generally to a thin continuous sheet formed material. The term barrier film as used herein refers generally to a film designed to provide good barrier properties.

Generally, while the products, polymers, materials, layers and processes are described in terms of "comprising" various components or steps, the products, polymers, materials, layers and processes can also "consist essentially of" or "consist of" the various components and steps.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

EXAMPLES

Materials

Dried Xylan powder, DP 2-7, 95% purity, 2% moisture content (Coreychem)

Sorbitol powder, 95% purity, 2% moisture content (Cargill)

CMC powder, DP 200, 95% purity, 12% moisture content (Nouryon)

Example 1—Preparation of Xylan/CMC/Sorbitol/Water Mixtures

A 65% xylan solution was prepared by gradually adding 13.4 kg of xylan powder into a stirred vessel containing 7 kg of water at 70° C. A 22% CMC solution in water and a 50% sorbitol solution in water at 70° C. were prepared in the same way.

Example 2—Preparation of Coating Colors

The solutions prepared in Example 1 were mixed to obtain an aqueous coating composition having a total solid content of 26.7 wt % and containing 55.5% CMC, 26% xylan and 18.5% sorbitol based on the total solid content of the composition. The mixture had a viscosity of 670 centipoise at 40° C.

Example 3—Coating of Paperboard

The coating colors were applied onto the surface of a paperboard substrate (Natura Life 260 g/m$^2$, uncoated) using short dwell application on offline coating with rod with a speed of 200 m/min, IR and air drier. The samples were coated either one (Sample ID 1) or with two (Sample ID 2) layers resulting in a coat weight of 6 g/m$^2$ and 12 g/m$^2$ respectively. The samples were conditioned in 23° C. and 50% relative humidity (RH) for several days before being analyzed.

Analyses

The samples were tested for occurrence of pinholes, grease resistance (KIT) and oxygen permeability (oxygen transmission rate, OTR), as follows:

The oxygen transfer rate (OTR) was measured in accordance with ASTM D3985, at a temperature of 23° C. and at 50% relative humidity (RH).

The number of pinholes is measured in accordance with EN13676:2001. The measurement involves treating the packaging material with a coloring solution (e.g. dyestuff E131 Blue in ethanol) and inspecting the surface microscopically.

The KIT value is a measure of the grease resistance and is measured in accordance with TAPPI T559.

The results of the analyses are presented in Table 1.

TABLE 1

| Sample ID | Coat weight (g/m$^2$) | Pinholes | KIT | OTR (cc/m$^2$/24 h/atm) |
|---|---|---|---|---|
| 1 | 6 | 1 | 8 | 30 |
| 2 | 12 | 0 | 12 | 1.7 |

The invention claimed is:

1. An aqueous barrier coating composition comprising:

20-80% by weight of a dissolved first polysaccharide having a first degree of polymerization (DP1) of at least 150, based on a total solids content of the aqueous barrier coating composition; and 20-80% by weight of a dissolved second polysaccharide having a second degree of polymerization (DP2) of 100 or less, based on the total solids content of the aqueous barrier coating composition;

wherein a ratio of DP1:DP2 is at least 10:1; and wherein the total solids content of the aqueous barrier coating composition is in a range of 10-90% by weight.

2. The aqueous barrier coating composition according to claim 1, wherein the ratio of DP1:DP2 is at least 20:1.

3. The aqueous barrier coating composition according to claim 1, wherein the aqueous barrier coating composition comprises 30-80% by weight of the first polysaccharide based on the total solids content of the aqueous barrier coating composition.

4. The aqueous barrier coating composition according to claim 1, wherein DP1 is in a range of 150-4000.

5. The aqueous barrier coating composition according to claim 1, wherein the first polysaccharide is selected from a group consisting of: a water-soluble hemicellulose, a water-soluble cellulose, a water-soluble starch, alginate, chitosan, pullulan, dextran, and agarose.

6. The aqueous barrier coating composition according to claim 1, wherein the first polysaccharide is selected from a group consisting of: a water-soluble hemicellulose, a water-soluble cellulose, a water-soluble starch, and alginate.

7. The aqueous barrier coating composition according to claim 1 wherein the first polysaccharide is selected from a group consisting of: carboxymethylcellulose, methylcellulose, hydroxyethyl cellulose, hydroxypropyl cellulose, hydroxylpropylmethyl cellulose, ethyl hydroxyethyl cellulose, and methyl ethyl hydroxyethyl cellulose.

8. The aqueous barrier coating composition according to claim 1, wherein the first polysaccharide is carboxymethylcellulose (CMC).

9. The aqueous barrier coating composition according to claim 1, wherein the aqueous barrier coating composition comprises 20-60% by weight of the second polysaccharide based on the total solids content of the aqueous barrier coating composition.

10. The aqueous barrier coating composition according to claim 1, wherein DP2 is in a range of 2-50.

11. The aqueous barrier coating composition according to claim 1, wherein the second polysaccharide is selected from a group consisting of: a water-soluble hemicellulose, a water-soluble cellulose, a water-soluble starch, alginate, chitosan, pullulan, dextran, and agarose.

12. The aqueous barrier coating composition according to claim 1, wherein the second polysaccharide is selected from a group consisting of: a water-soluble hemicellulose, a water-soluble cellulose, a water-soluble starch, and alginate.

13. The aqueous barrier coating composition according to claim 1, wherein the second polysaccharide is xylan.

14. The aqueous barrier coating composition according to claim 1, further comprising 1-30% by weight of a filler based on the total solids content of the aqueous barrier coating composition.

15. The aqueous barrier coating composition according to claim 14, wherein the filler is selected from a group consisting of: clay, talcum, $CaCO_3$, fibers, and combinations thereof.

16. The aqueous barrier coating composition according to claim 1, further comprising 1-30% by weight of a plasticizer based on the total solids content of the aqueous barrier coating composition.

17. The aqueous barrier coating composition according to claim 16, wherein the plasticizer is selected from a group consisting of: glycerol, xylitol, sorbitol, maltitol, ethylene glycol, propylene glycol, butanediol, pentaerythritol, trimethylolpropane, and combinations thereof.

18. The aqueous barrier coating composition according to claim 1, further comprising 0.1-10% by weight of a polycationic polymer based on the total solids content of the aqueous barrier coating composition.

19. The aqueous barrier coating composition according to claim 18, wherein the polycationic polymer is a polyethyleneimine (PEI).

20. The aqueous barrier coating composition according to claim 1, wherein the total solids content of the aqueous barrier coating composition is in a range of 10-80% by weight.

21. A coated substrate comprising:

a substrate coated with the aqueous barrier coating composition according to claim 1.

22. The coated substrate according to claim 21, wherein the coated substrate is a fiber-based substrate.

23. The coated substrate according to claim 21, wherein said coated substrate has a repulpability having a reject rate (as determined according to the PTS RH 021/97 test method) below 20%.

24. A barrier film or coating comprising:

20-80% by weight of a first polysaccharide having a first degree of polymerization (DP1) of at least 150, based on a total solids content of the barrier film or coating; and 20-80% by weight of a second polysaccharide having a second degree of polymerization (DP2) of 100 or less, based on the total solids content of the barrier film or coating;

wherein the ratio of DP1:DP2 is at least 10:1.

25. The barrier film or coating according to claim 24, wherein a basis weight of the film or coating is in the range of 5-15 $g/m^2$.

26. The barrier film or coating according to claim 24, wherein the thickness of the film or coating is in the range of 1-15 μm.

27. The barrier film or coating according to claim 24, wherein the barrier film or coating is prepared from an aqueous barrier coating composition.

28. The barrier film or coating according to claim 24, wherein the barrier film or coating has an oxygen transmission rate (OTR), measured according to the standard ASTM D-3985 at 50% relative humidity and 23° C., of less than 50 $cc/m^2/24$ h/atm.

29. The barrier film or coating according to claim 24, wherein the barrier film or coating has a KIT value of at least 8, as measured according to standard TAPPI T559.

30. A method for manufacturing a barrier film or coating, comprising:

a) preparing the aqueous barrier coating composition according to claim 1;

b) forming a wet film or coating of the aqueous barrier coating composition; and c) drying the wet film or coating to obtain the barrier film or coating.

31. The method according to claim 30, wherein a basis weight of the barrier film or coating is in a range of 5-15 $g/m^2$.

32. The method according to claim 30, wherein a thickness of the barrier film or coating is in a range of 5-15 μm.

* * * * *